United States Patent [19]
McMillan, Jr.

[11] 3,848,128
[45] Nov. 12, 1974

[54] CONTROL CHAMBER APPARATUS FOR POLLUTANT DETECTORS

[75] Inventor: Robert D. McMillan, Jr., Houston, Tex.

[73] Assignee: McMillan Electronics Corporation

[22] Filed: June 30, 1972

[21] Appl. No.: 268,136

[52] U.S. Cl............... 250/336, 23/254 R, 250/361
[51] Int. Cl.............................................. G01t 1/20
[58] Field of Search ............ 250/361, 336; 356/246; 23/254 R

[56] References Cited
UNITED STATES PATENTS
3,726,599   4/1973   Neary ................................ 356/246

Primary Examiner—James W. Lawrence
Assistant Examiner—Davis L. Willis
Attorney, Agent, or Firm—Pravel & Wilson

[57] ABSTRACT

A control chamber apparatus for detectors of pollutants, such as ozone and nitric oxide, with a stabilized, controlled test environment for improved detection capability.

10 Claims, 6 Drawing Figures

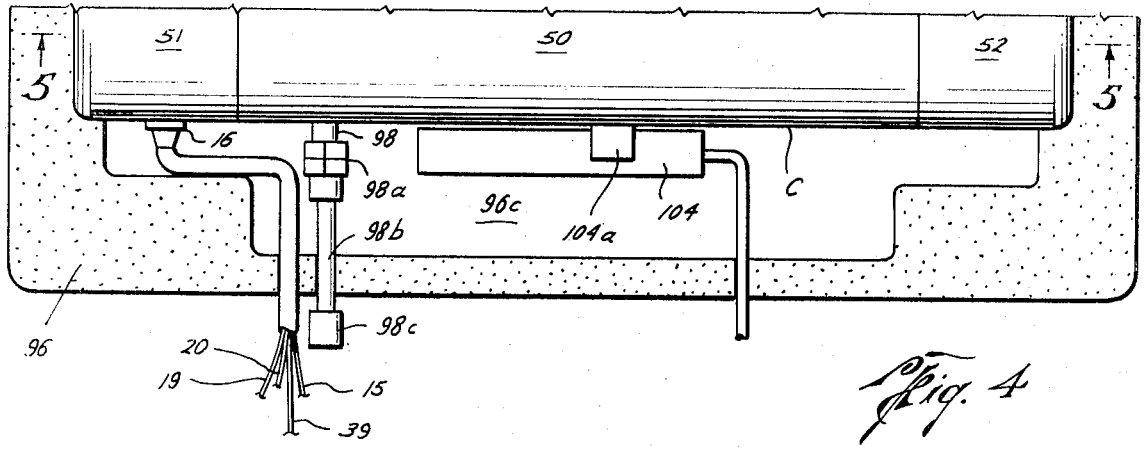
Fig. 4
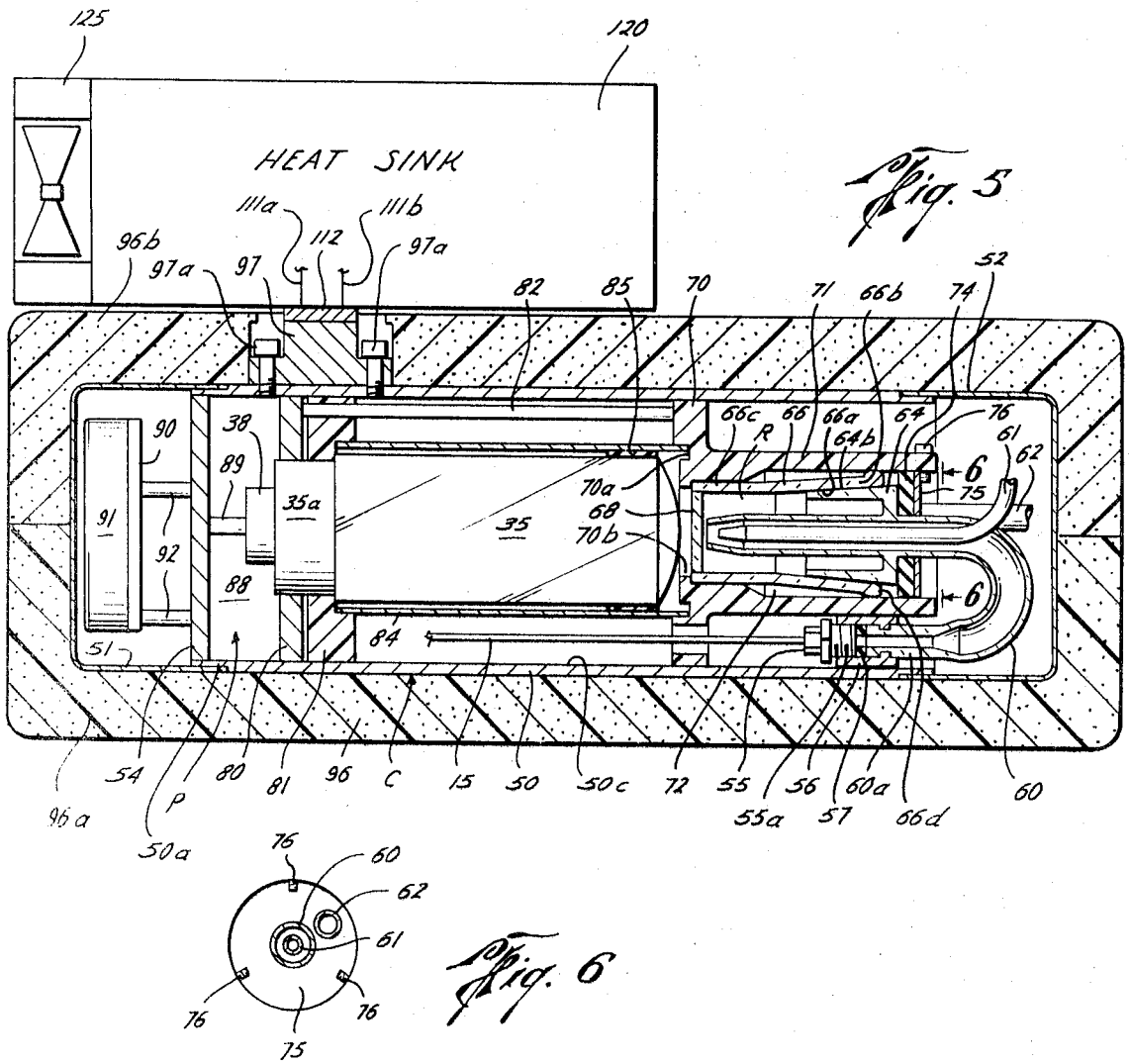
Fig. 5
Fig. 6

CONTROL CHAMBER APPARATUS FOR POLLUTANT DETECTORS

BACKGROUND OF THE INVENTION

1. Field Of The Invention

The present invention relates to control chamber apparatus for pollutant detectors.

2. Description Of Prior Art

Pollution detectors have used chemiluminescent detection techniques when the pollutant, such as ozone or nitric oxide, reacted in a test chamber with a reagent chemical, such as ethylene or ozone, respectively, and caused the emission of photons. The intensity of photon emission was measured with a photomultiplier tube to determine the pollutant level. When detecting trace or small levels of pollutants, accuracy was important.

The signal-to-noise ratio of the output signal from the photomultiplier tube was thus increased. A first method of increasing the signal-to-noise ratio required very high quality, expensive, sensitive photomultiplier tubes. A second method was to cool the tube to a low temperature. When the temperature of the tube varied, the noise level, or "dark current" of the tube fluctuated, reducing detection accuracy. When the temperature was low, an optically transparent insulated window of considerable thickness was required between the cooled tube and the ambient atmospheric air being tested in the test chamber to prevent water moisture buildup or water vapor condensation on the window. The window increased the spacing between the photomultiplier tube and the test chamber, decreasing the signal strength of the photon emission received by the photomultiplier tube in ratio by the inverse square of the increased spacing.

SUMMARY OF INVENTION

Briefly, the present invention provides a new and improved control chamber apparatus for a pollutant detector for chemiluminescent detection of pollutant by reacting a reagent or reaction gas and a sample in a reaction chamber. A photometric circuit measures the pollutant level by sensing the chemiluminescence released from the reaction between the reagent and the sample. The photometric circuit and the reaction chamber are mounted within a canister, and a control circuit regulates the temperature in the canister so that detection conditions are stabilized for accurate determination of the amount of pollutant.

The control circuit includes a thermostat which senses the temperature in the canister, a Peltier effect apparatus for removing heat from the canister when energized, and a switch responsive to the thermostat for energizing the Peltier effect apparatus. A heat sink and fan are provided to extract heat from and cool the Peltier effect apparatus.

It is an object of the present invention to provide a new and improved control chamber apparatus for a pollutant detector.

BRIEF DESCRIPTION OF DRAWINGS

FIG. 4 is a plan view, taken partly in cross-section of the apparatus of the present invention;

FIG. 5 is a cross-sectional view, taken along the lines 5—5 of FIG. 4; and

FIG. 6 is a cross-sectional view taken along the lines 6—6 of FIG. 5.

DESCRIPTION OF PREFERRED EMBODIMENT

Figure 1:
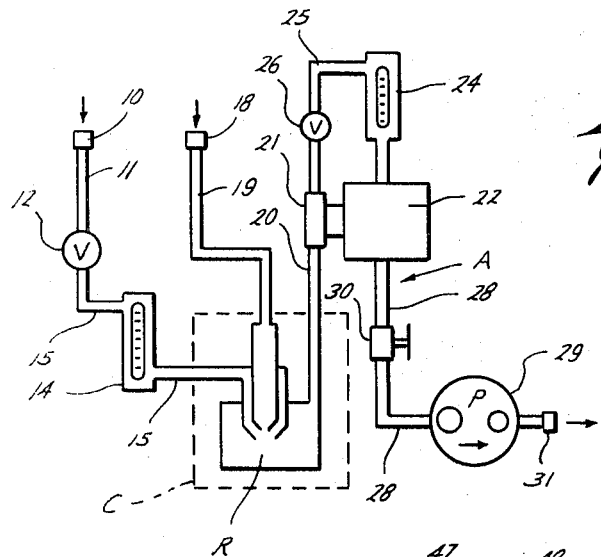
FIG. 1 is a schematic diagram of the flow system of the apparatus of the present invention.

In the drawings, the letter A designates generally the control chamber apparatus of the present invention for use in a pollutant detector. The pollutant detector uses the known technique of chemiluminescent detection of a pollutant by reacting a reagent or reaction gas and a sample. When the pollutant being monitored is ozone in atmospheric air, the reagent is ethylene. As is known, ethylene and ozone react in a flameless oxidation giving rise to a photon emission.

When the pollutant being monitored is nitric oxide, the reagent is ozone. The nitric oxide and the ozone react and yield a photon emission in a chemiluminescent reaction, as is known. It should be further understood that the control chamber apparatus A of the present invention may be used in other types of chemiluminescent detection of pollutants.

In the apparatus A a photometric circuit T measures the pollutant level by sensing the photon emission or chemiluminescence released from the reaction between the reagent and the sample in a reaction chamber R. The photometric circuit P and the reaction chamber R are mounted within a canister C.

A control circuit K regulates the temperature in the canister C so that detection conditions are stabilized for accurate determination of the amount of pollutant.

The reaction chamber R (FIGS. 1 and 2) receives reagent gas at an inlet 10 thereof. A conduit 11 connects the inlet 10 to a control valve 12. A flowmeter 14 is connected in a conduit 15 between the valve 12 and the gasket 16 (FIG. 4) mounted with the canister C. Flow of reagent into the inlet 10 is controlled by a pressure regulator or other suitable means.

An inlet 18 permits the sample, for example atmospheric ambient air, to pass therethrough and through a conduit 19 to the gasket 16.

An outlet conduit 20 (FIGS. 1 and 4) provides an outlet from the reaction chamber R for the remaining sample and the reaction products of the reaction between the reagent and sample. A control section 21 of a flow regulator 22 controls the flow rate of the output of the reaction chamber R in response to control from the flow regulator 22. The flow regulator 22 is a conventional flow regulator and may be, for example, a Fairchild-Hiller Model No. 59.

A flowmeter 24 measures the flow rate of the output from the reaction chamber R through a conduit 25. The conduit 25 is connected through the control 21 to the conduit 20. A needle valve 26 may be mounted in the conduit 25 for precision adjustment of the flow rate from the reaction chamber R.

A conduit 28 connects a pump 29 to the flow regulator 22. The pump 29 causes the extraction of the sample gas and reaction products from the reaction chamber R. A vacuum relief valve 30 is connected in the conduit 28 to allow the entry of air into the pump 29. The air inlet in the valve 30 permits additional air to enter the pump 29 should the flow rate thereof increase, compensating for pump flow variations without affecting the operation of the flow regulator 22.

The photometric circuit T includes a photomultiplier tube 35 which senses the intensity of reaction in the reaction chamber R by measuring the chemiluminescence or photon emission therefrom. As is known, a dynode chain resistor network 38 of series-connected resistors is provided with the photomultiplier tube 35 to regulate the bias applied to the dynode plates in the photomultiplier tube 35. In this manner, the proper operating bias level for each dynode in the photomultiplier tube is provided.

A conventional high voltage power supply 37 provides the operating bias over a conductor 36 to be applied to the dynode resistor chain 38 of the photomultiplier tube 35. The conductor 36 is one conductor in a multi-conductor cable 39 connected to the gasket 16 at the canister C (FIG. 4).

An electrometer 41 of the photometric circuit P, a high input impedance operational amplifier, provides an impedance match with the output of the photomultiplier tube 35. The electrometer 41 is electrically connected by a conductor 42 of the cable 39 through a buffer amplifier 44 to an ammeter 46. The ammeter 46 indicates the current output from the photomultiplier tube 35 and accordingly indicates the chemiluminescence or photon emission from the reaction chamber R.

The electrometer 41 is further connected by the conductor 42 through a second buffer amplifier 47 to a scaling output potentiometer 48. An output terminal 49 is connected with the potentiometer 48 so that the electrical output of the photometric circuit P may be recorded, telemetered or otherwise used as desired.

The reaction chamber R and the photometric circuit P are mounted within the canister C in the present invention. In this manner, the photomultiplier tube 35 of the photometric circuit P is protected from undesired ambient light, stray electromagnetic fields and electrostatic fields. Further, as will be set forth below, the temperature of the photomultiplier tube and the reaction chamber R in the canister C is maintained substantially constant within regulated limits so that noise in the photomultiplier tube, known in the art as "dark current," does not fluctuate. Further, with the flow control system of the present invention (FIG. 1), the flow rate of the sample gas is large in proportion to the volume of the reaction chamber R is such that the temperature of the gas leaving the reaction chamber R through the conduit 20 is substantially equal to the gas entering the reaction chamber R through the conduit 19. In this manner, condensation and moisture collection in the reaction chamber R is minimized.

Further, since the photomultiplier tube 35 and the reaction chamber R are maintained at substantially constant temperature within the canister C, the chamber R can be mounted within the canister C substantially adjacent the photomultiplier tube 35, enhancing the signal strength received thereby.

Considering the canister C more in detail (FIGS. 4-6), a center housing member 50 has an end cap 51 mounted at an end mounting surface 50a thereof (FIG. 5). An end cap 52 is mounted with the center housing member 50 at an opposite end 50b thereof. The end caps 51 and 52 hermetically seal with the center housing member 50 to hermetically seal the canister C.

The gasket 16 is mounted with the end cap 51 and has openings therein to permit passage separately therethrough of the conduits 15, 19 and 20 and the cable 39.

The conduits 15, 19 and 20 and the cable 39 pass through the gasket 16 and through openings in an end plate 54 mounted in the end 50a of the housing member 50 into the interior thereof. The conduit 15 has an end fitting 55 (FIG. 5) formed at an end thereof within the canister C. The end fitting 55 engages a second end fitting 56 along a threaded surface 55a. An annular seal 57 is mounted between the end fittings 55 and 56 for sealing purposes.

The second end fitting 56 is mounted with an inlet end 60a of a curved reagent inlet tube 60 which conveys the reagent gas to the reaction chamber R.

In a like manner, a curved sample inlet tube 61 is connected with end fittings to the conduit 19, and an outlet tube 62 is connected through the end fittings to the outlet conduit 20.

Since the connection between the tube 61 and the conduit 19 and between the tube 62 and the conduit 20 are of like structure to the connection between the conduit 15 and the tube 60, such connections are not shown in the drawings in order to preserve clarity therein.

The tubes 60, 61 and 62 are preferably integrally formed as part of a first reaction chamber housing member 64 from a suitable fire-resistant, or pyrex, glass or other suitable material. The tubes 60 and 61 are concentric to the first reaction chamber housing member 64 while the outlet tubes 62 exits along a coaxial, non-concentric axis (FIG. 6).

A second reaction chamber housing member 66 has a tapered surface 66a formed along the interior of a first end 66b (FIG. 5) thereof. The tapered surface 66a sealingly engages a coacting tapered external surface 64b of the first reaction chamber housing member 64 to seal a first end of the reaction chamber R. A transparent sealing plate 68 is formed in a second end 66c of the second reaction chamber housing member 66 to seal the opposite end of the reaction chamber R.

A mounting member 70 is mounted within the canister C adjacent an inner surface 50c of the center housing member 50 (FIG. 5). A first receiving socket 72 is formed in a sleeve 71 extending outwardly from the mounting member 70. A cushion 74 and a spacer ring 75 mount the first reaction chamber housing member 64 and the second reaction chamber housing member 66, and consequently the reaction chamber R, in the first receiving socket 72, with screws 76 or other suitable means holding same in place. The second reaction chamber housing member 66 engages an inner wall of the sleeve 71 along a lip 66d adjacent the end 66b and along an outer surface of the opposite end 66c (FIG. 5).

The photomultiplier tube 35 of the photometric circuit P is mounted at a base 35a thereof with a plate 80 and an insulator 81 within the canister C (FIG. 5). A standoff bar 82 extends between the plate 80 and the mounting member 70. A tubular magnetic shield member, known as a Netic and Co-Netic Mu Metal Shield, spaced from the photomultiplier tube 35 by a gasket 85, extends between the insulator 81 and a second receiving socket 70a formed in the mounting member 70. An aperture 70c is formed extending between the first receiving socket 72 and the second receiving socket 70a, and the receiving sockets 70a and 72 are thus formed in the mounting member 70 adjacent each other (FIG. 5) so that the reaction chamber R and the photomultiplier tube may be mounted in the canister C in close proximity and substantially adjacent each other. In this manner, the signal strength sensed by the photomultiplier tube from the photon emission in the reaction chamber R is significantly enhanced due to the decreased spacing therebetween.

The dynode resistor assembly 38 of the photometric circuit P is mounted with the base 35a of the photomultiplier tube 35 in a space 88 formed between the plates 54 and 80 by a standoff bar 89. The dynode resistor assembly 38 is electrically connected, as has been set forth to the electrometer 41.

Figure 2:
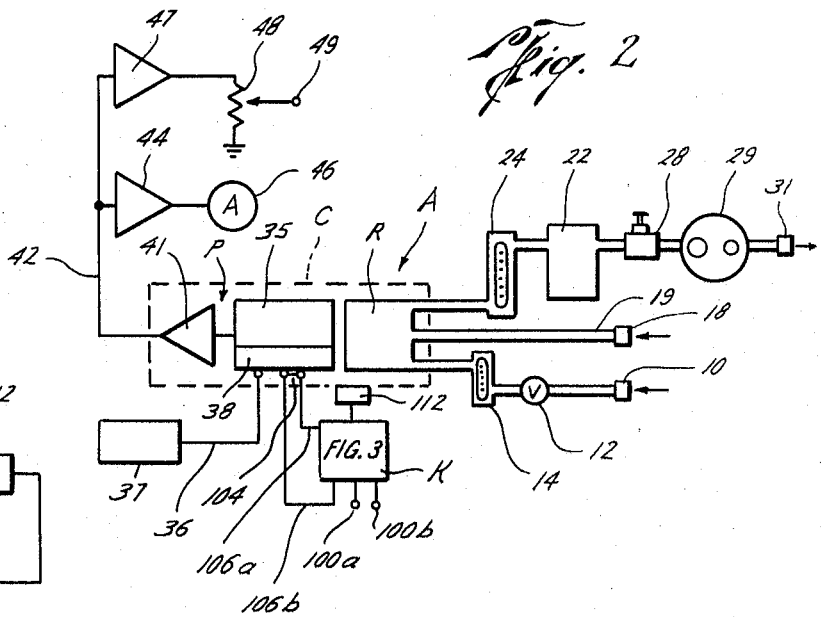
FIG. 2 is a schematic diagram of the apparatus of the present invention.

The electrometer 41 is mounted with a socket assembly 90 beneath a cover 91 within the end cap 51 of the canister C. The socket 90 is spaced from the plate 54 by standoff bar 92. As has been set forth, the electrometer 41 is electrically connected by a conductor 42 of the cable 39 through the gasket 16 to output and monitoring devices (FIG. 2).

A cover 96 of polystyrofoam or other suitable thermal insulative material is mounted with the exterior of the canister C to thermally insulate the canister C and to assist the control circuit K in maintaining the temperature in the canister C at the desired level. The cover 96 is formed into two halves 96a and 96b to fit about the canister C. An opening 96c is formed in the cover 96 so that a heat transfer block 97 may be mounted with the canister C by screws 97a or other suitable means. The heat transfer block 97 is in contact with the center housing member 50 of the canister C and permits heat transfer therefrom.

A chamber 96c is formed in the cover 96 (FIG. 4) to permit connections between the canister C and the remainder of the apparatus A to be made.

A gas inlet 98 permits a charge of gas to be introduced into the hermetically sealed canister C. The gas introduced through the inlet 98 is furnished through a fitting 98a by a conduit 98b from a molecular sieve dehydrator or other suitable gas dehumidifying means by a conduit 98b and an inlet 98c. The gas introduced into the canister B at the inlet 98 is preferably an inert gas or nitrogen. The dehumidified gas introduced into the canister C at the inlet 98 assists in maintaining substantially equal temperatures within the canister C, while providing an essentially "zero" relative humidity gaseous environment to prevent condensation upon the sensitive electronic circuitry in the canister C. The dehumidified gas in the canister C further reduces the "dark current" characteristic of the photomultiplier tube 35.

The control circuit K regulates the temperature in the canister C so that the temperature of the photomultiplier circuit P and the reaction chamber R is maintained substantially constant so that detection conditions are stabilized. With the temperature in the canister C substantially constant, the operating conditions of the photometric circuit P and the reaction chamber R are stabilized, and the amount of pollutant in the sample may be more accurately determined.

Figure 3:
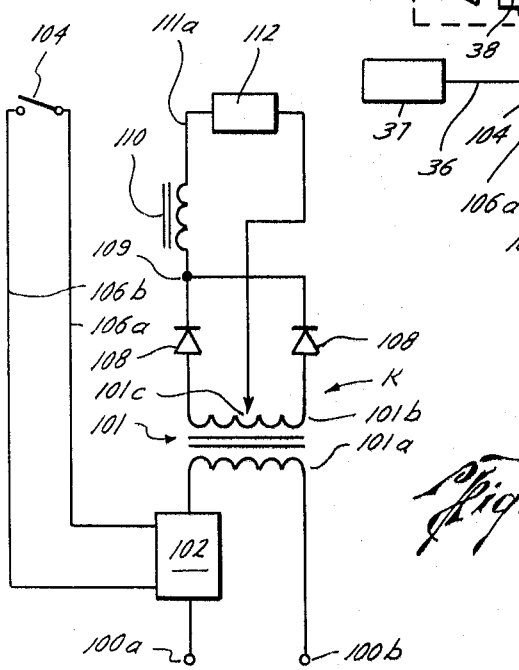
FIG. 3 is a schematic electrical circuit diagram of the control circuit of the apparatus.

Considering the control circuit K more in detail (FIGS. 2 and 3), a pair of input terminals 100a and 100b receive operating electrical power from a suitable alternating current power source. A primary coil 101a of a transformer 101 is electrically connected to the input terminals 100a and 100b (FIG. 3). A switch 102 is electrically connected between the input terminal 100a and the primary coil 101a. The switch 102 may be a conventional solid-state relay, or a conventional electro-mechanical relay responsive to the current flow therethrough. The switch 102 permits current to flow between the input terminal 100a and the primary coil 101a in response to the condition of a thermostat 104.

The thermostat 104 is mounted with the canister C by snap rings 104a (FIG. 4) or other suitable means within the pocket 96c formed in the cover 96. The thermostat 104 is electrically connected by conductors 106a and 106b to the switch 102 (FIG. 3). When the thermostat 104 closes due to the temperature of the canister C exceeding the desired operating temperature, the switch 102 is energized and permits current to flow through the primary coil 101a of the transformer 100.

A secondary coil 101b of the transformer 101 is electromagnetically coupled with the primary coil 101a. Rectifying diodes 108 are electrically connected at each of the outputs of the secondary coil 101b to rectify the alternating current output thereof and provide a substantially direct current output signal at a terminal 109. A choke coil 110 limits the ripple, or alternating current component, of the voltage present at the terminal 109.

A Peltier effect apparatus 112 is electrically connected by a conductor 111a to the choke 110. The Peltier effect apparatus 112 is electrically connected by a conductor 111b to a center tap 101c of the secondary coil 101b of the transformer 101. A suitable Peltier effect apparatus for use with the present invention is Borg-Warner Model No. 940-31.

As is known, a Peltier effect apparatus absorbs heat at a first surface thereof and transfers such heat to a second surface when receiving current.

The Peltier effect apparatus 112 is mounted with a heat absorbing surface 112a adjacent the heat transfer block 97 (FIG. 5), and a heat transfering surface 112b mounted adjacent a heat sink 120. Accordingly, when the switch 102 is energized, permitting current to flow through the transformer 101, the Peltier effect apparatus 112 is energized and permits heat transfer from the heat transfer block 97 to the heat sink 120. The heat sink 120 absorbs excess heat from the Peltier effect apparatus 112. A fan 125 is provided to cool the heat sink 120 and prevent excess heat accumulation therein.

In the operation of the present invention, the pump 29 is energized to begin drawing sample through the inlet 18 and conduit 19 to the reaction chamber R. The valve 12 is open to permit the reagent to flow through the conduit 15 into the reaction chamber R. When the reagent and pollutant contained in the sample meet in the reaction chamber R a chemiluminescent reaction takes place, and the photomultiplier 235 senses such reaction and furnishes an output signal through the electrometer 41 to suitable monitoring apparatus.

As has been set forth, the photometric circuit P and the reaction chamber R are contained within the canister C, permitting the temperature of both to be controlled and regulated by the control circuit K. Mounting the photometric circuit P and the reaction chamber R within the canister C further permits the reaction chamber R to be mounted in close proximity to the photomultiplier tube 35 increasing the signal sensed by the photomultiplier tube 35.

The thermostat 104 of the control circuit K, mounted with the canister C senses the temperature of the components of the apparatus A mounted therein, and closes when the predetermined temperature limit is reached. When the thermostat 104 closes, the switch 102 is energized, permitting the flow of current from the input terminals 100a and 100b through the transformer 101 to the Peltier effect apparatus 112. Current flow through the Peltier effect apparatus 112 permits the excess heat in the canister C to pass from the heat transfer block 97 through the Peltier effect apparatus to the heat sink 120 where such heat is dissipated by air moved by the fan 125.

In this manner, the temperature of the canister C and the reaction chamber R and photometric circuit P therein are stabilized and regulated so that detection conditions are stabilized for accurate determination of the amount of pollutant in the sample.

The foregoing disclosure and description of the invention are illustrative and explanatory thereof, and various changes in the size, shape, materials, components, circuit elements, wiring connections and contacts as well as in the details of the illustrated circuitry and construction may be made without departing from the spirit of the invention.

I claim:

1. A control chamber apparatus for a pollutant detector for chemiluminescent detection of pollutants by reacting a reagent with a sample to determine the amount of pollutant therein, comprising:
   a. reaction chamber means for receiving the reagent and the sample;
   b. photometric circuit means for measuring the reaction between the reagent and the sample in said reaction chamber means;
   c. canister means for housing both said reaction chamber means and said photometric means therein; and
   d. control means for regulating temperature in said canister means to thereby regulate the temperature of said reaction chamber means and photometric circuit means wherein detection conditions are stabilized for accurate determination of the amount of pollutant.

2. The apparatus of claim 1, further including:
   means for magnetically shielding said photometric circuit means.

3. The apparatus of claim 1, wherein said photometric circuit means comprises:
   a. photomultiplier tube means for sensing the intensity of reaction in said reaction chamber means;
   b. dynode chain means for regulating the bias applied to said photomultiplier tube means; and
   c. electrometer means for amplifying the output of said photomultiplier tube means.

4. The apparatus of claim 1, further including:
   cover means for thermally insulating said canister means wherein the temperature in said canister means is maintained.

5. The apparatus of claim 1, further including:
   a. a mounting member in said canister means;
   b. said mounting member having a first receiving socket and a second receiving socket formed therein;
   c. said mounting member further having an aperture formed therein extending between said first receiving socket and said second receiving socket;
   d. said first receiving socket and said second receiving socket being formed in said mounting member adjacent each other;
   e. said reaction chamber means being mounted in said first receiving socket; and
   f. said photometric circuit means being mounted in said second receiving socket substantially adjacent said reaction chamber means, wherein spacing between said reaction chamber means and said photometric circuit means is reduced.

6. The apparatus of claim 1, further including:
   a. charging gas inlet means formed in said enclosure means, wherein said canister means may receive a charge of dehumidified gas therein to maintain substantially equal temperature conditions within said canister means.

7. The structure of claim 1, further including:
   flow control means for controlling the flow rate of the sample through said reaction chamber means.

8. The structure of claim 1, wherein said control means comprises:
   a. thermostat means for sensing the temperature in said canister means;
   b. Peltier effect means for cooling said canister means when energized; and
   c. switch means responsive to said thermostat means for energizing said Peltier effect means.

9. The structure of claim 8, further including:
   a. heat sink means for extracting excess heat from said Peltier effect means; and
   b. fan means for cooling said heat sink means.

10. The structure of claim 5, further including:
    a. sealing plate means for sealing said aperture in said mounting member;
    b. reagent inlet means for conveying reagent to said reaction chamber;
    c. sample inlet means for conveying the sample to said reaction chamber; and
    d. said reagent inlet means directing the reagent and said sample inlet means directing the sample against said sealing plate means.

* * * * *